US012091187B2

(12) United States Patent
Neis et al.

(10) Patent No.: US 12,091,187 B2
(45) Date of Patent: Sep. 17, 2024

(54) DETERMINING ALERT LEVELS BASED ON CREW RESPONSES

(71) Applicant: THE BOEING COMPANY, Chicago, IL (US)

(72) Inventors: Stefan Neis, Bensheim (DE); Sarah Schmidt, Frankfurt (DE); Sebastian Sprengart, Ober-Ramstadt (DE)

(73) Assignee: THE BOEING COMPANY, Arlington, VA (US)

( * ) Notice: Subject to any disclaimer, the term of this patent is extended or adjusted under 35 U.S.C. 154(b) by 230 days.

(21) Appl. No.: 17/749,875

(22) Filed: May 20, 2022

(65) Prior Publication Data
US 2023/0373648 A1 Nov. 23, 2023

(51) Int. Cl.
B64D 43/00 (2006.01)
B64D 45/00 (2006.01)

(52) U.S. Cl.
CPC ............ B64D 43/00 (2013.01); B64D 45/00 (2013.01); B64D 2045/007 (2013.01)

(58) Field of Classification Search
CPC .................................................... B64D 43/00
See application file for complete search history.

(56) References Cited

U.S. PATENT DOCUMENTS

| 7,031,812 | B1* | 4/2006 | Pettigrew | ................ | B64C 27/06 |
| | | | | | 701/14 |
| 2010/0161157 | A1 | 6/2010 | Guilley et al. | | |
| 2013/0214941 | A1 | 8/2013 | Rogers et al. | | |
| 2014/0121863 | A1* | 5/2014 | Barraci | .................. | G01C 23/00 |
| | | | | | 701/14 |
| 2016/0083107 | A1 | 3/2016 | Vautier et al. | | |
| 2017/0291722 | A1* | 10/2017 | Owens | ............... | G05B 19/0428 |
| 2019/0016472 | A1 | 1/2019 | Morowsky et al. | | |
| 2020/0277080 | A1* | 9/2020 | Wiegman | ................ | B60L 50/60 |
| 2022/0358696 | A1* | 11/2022 | Holder | ................... | G08G 5/025 |
| 2024/0051679 | A1* | 2/2024 | Bosson | ............... | G08G 5/0043 |

FOREIGN PATENT DOCUMENTS

EP 4293320 A1 12/2023

OTHER PUBLICATIONS

European Patent Office, extended European Search Report for Application 23156912.0-1009 dated Nov. 16, 2023.

* cited by examiner

Primary Examiner — Travis R Hunnings
(74) Attorney, Agent, or Firm — Patterson + Sheridan, LLP

(57) ABSTRACT

The present disclosure describes identifying a normal mission of a vehicle based on descriptions of capabilities of the vehicle in a plurality of operational phases where the normal mission is divided into the plurality of operational phases, identifying violations of the descriptions of the capabilities that cause the vehicle to deviate from the normal mission in at least one of the plurality of operational phases, identifying operational impacts on the vehicle caused by the violations, assigning alert levels to the operational impacts, populating an alert database that stores alert events corresponding to the violations and the alert levels assigned to the operational impacts; and generating software code to monitor sensor data during operation of the vehicle to identify the violations.

20 Claims, 8 Drawing Sheets

DETERMINING ALERT LEVELS BASED ON CREW RESPONSES

FIELD

Aspects of the present disclosure relate to prioritizing alerts for crew responses in a vehicle, such as an aircraft.

BACKGROUND

Modern day aircraft generate alerts to inform crew members of problems or issues in the aircraft that need their attention or require them to perform an action. Currently, the aircraft stores a static database which contains all pre-defined alerts with their characteristics. These characteristics dictate conditions when the alert is issued, the static alert level or category (e.g., warning, caution, or advisory), and alert text which can include actions to be performed. The static database can be updated as additional insight is learned, however the static database will always output the same information regardless when the alert occurs. Further, the alerts are typically displayed to the crew in the order the alerts are generated, with the newest alert being displayed at the top of the list.

SUMMARY

The present disclosure provides a method, system, and computer-readable medium in several aspects, that include identifying a normal mission of a vehicle based on descriptions of capabilities of the vehicle in a plurality of operational phases where the normal mission is divided into the plurality of operational phases, identifying violations of the descriptions of the capabilities that cause the vehicle to deviate from the normal mission in at least one of the plurality of operational phases, identifying operational impacts on the vehicle caused by the violations, assigning alert levels to the operational impacts, populating an alert database that stores alert events corresponding to the violations and the alert levels assigned to the operational impacts, and generating software code to monitor sensor data during operation of the vehicle to identify the violations.

In one aspect, in combination with any example above or below, where assigning the alert levels to the operational impacts further includes determining crew responses for the operational impacts, and determining a type of each of the crew responses, wherein the alert levels are assigned based on the type of each of the crew responses.

In one aspect, in combination with the previous example, where assigning the alert levels to the operational impacts further comprises determining an urgency for the crew responses that require action by a crew member in the vehicle where the alert levels for the crew responses that require action are assigned based on the urgency, where the crew responses that request the crew member to perform mission re-planning are always assigned a first alert level and the crew responses that request the crew member to change a behavior are always assigned a second alert level different from the first alert level.

In one aspect, in combination with any example above or below, that includes prioritizing the operational impacts in each of the alert levels, such that operational impacts assigned the same alert level have different priorities.

In one aspect, in combination with any example above or below, where each of the operational impacts is assigned only one alert level, and the method, system, or computer-readable medium includes determining that a first operational impact of the operational impacts corresponds to a plurality of crew response types where the plurality of crew response types are assigned different alert levels, assigning the highest one of the different alert levels to the first operational impact.

In one aspect, in combination with any example above or below, where the vehicle is an aircraft and the plurality of operational phases includes a plurality of flight phases occurring when the aircraft travels between airports.

In one aspect, in combination with any example above or below, the method, system, or computer-readable medium includes executing the software code in the vehicle, detecting an alert event in a vehicle using the software code, querying the alert database to identify an alert level assigned to an operational impact corresponding to the alert event, and outputting, for display in a graphical user interface (GUI), the alert event based on the alert level.

BRIEF DESCRIPTION OF THE DRAWINGS

So that the manner in which the above recited features can be understood in detail, a more particular description, briefly summarized above, may be had by reference to example aspects, some of which are illustrated in the appended drawings.

DETAILED DESCRIPTION

Figure 1:
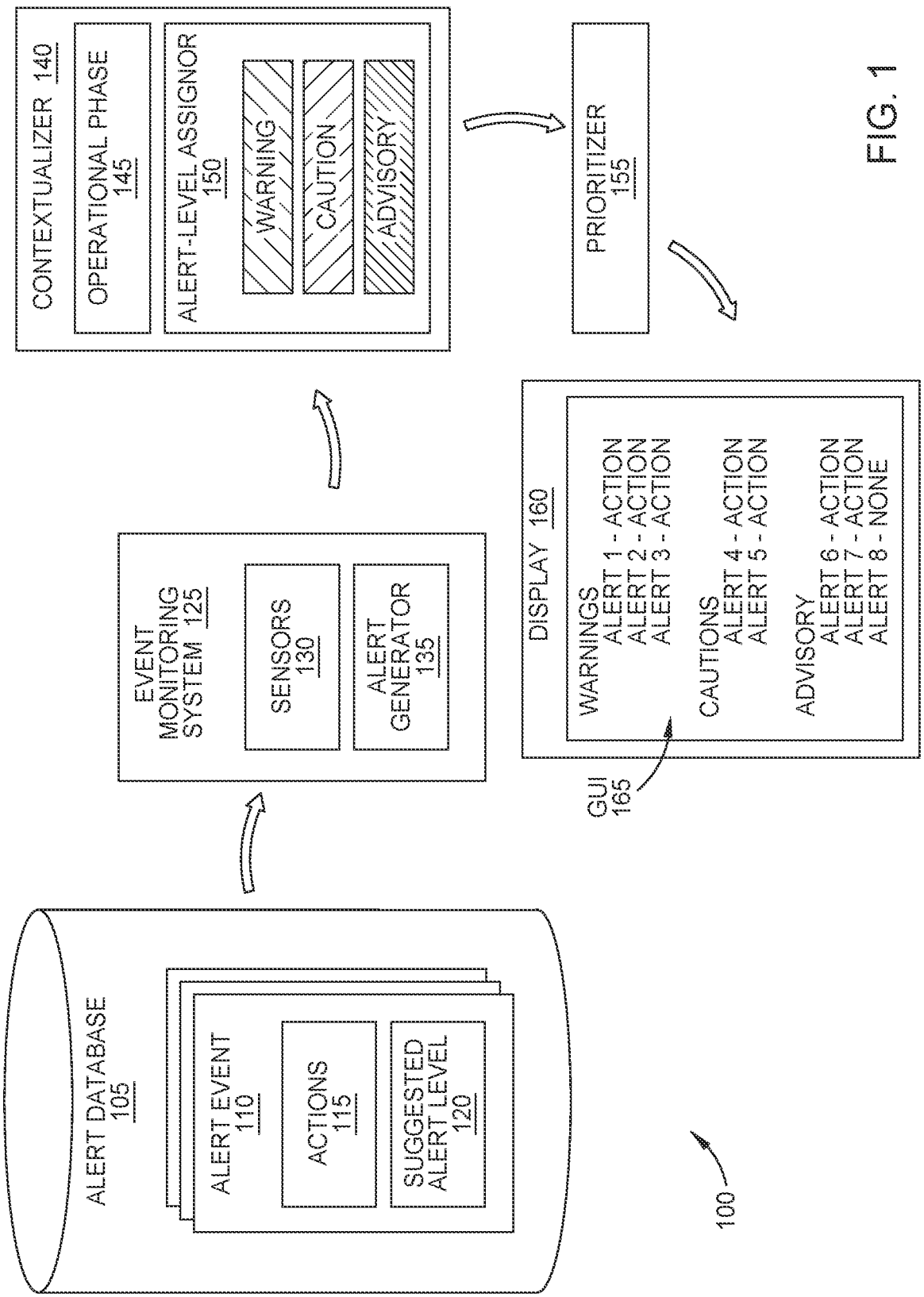
FIG. 1 depicts examples of a system that prioritizes alerts for a vehicle, according to one aspect described herein.

Displaying alerts to the crew in the order the alerts are generated ignores the different levels of urgency of the alerts which means the crew members may have to perform their own evaluation of the alerts in order to identify the alert to handle first. The present disclosure describes systems and methods for prioritizing alerts used to inform a crew member in a vehicle (e.g., an aircraft, boat, submarine, bus, automobile, etc.) to take an action such as executing a checklist, executing a maneuver, (re-) configure a system or the vehicle, or make a decision. Other alerts, however, do not necessarily trigger an action, but are "for awareness only" where a (subsequent) action may or may not be required, which depends on the context or the plans. Instead of relying on a static database to assign an alert level to the alerts, the aspects herein identify an operational phase of the vehicle and assign the alert level in response. For example, the system can determine the current flight phase of an aircraft (e.g., takeoff, cruising, landing, etc.) and determine the alert level based on an association of the flight phase to the alert. For instance, if there is a hydraulic issue in the braking system, the system may assign a higher alert level if the aircraft is landing than when the aircraft is cruising. That is, the system can contextual the alert using the operational phase of the vehicle, which permits the system to better prioritize the alerts. For example, problems in a vehicle can often trigger multiple alerts. The aspects herein permit the vehicle to prioritize the alerts so that the crew members know which alerts deserve their attention first based on the action(s) associated with the alert.

Previous alert systems used a static database which contains all pre-defined alerts with their characteristics. These include conditions when the alert is issued, the suggested alert level (e.g., warning, caution, advisory level), and alert text. The static database can be updated over the years. Incidents and accidents, insight from the operational world, regulatory mandates, and customer enquiries can be used to adjust the suggested alert levels of individual alert event, and alerting conditions can be added. However, the manufacturer and other entities (e.g., government regulators) often have different understandings of which alert level each alert should have when preparing a new aircraft for certification. A general lack of transparency and means to proof correctness and completeness contribute to this issue. Thus, the previous way of populating the alert database is cumbersome and is difficult to vet.

As discussed herein, the alert database can instead be generated to provide information that can be used to contextualize the alert events to remove, where appropriate, the immediacy of alert events that have operational impacts on future operational phases of the vehicle. The following describes techniques that are applied to derive the alert level for an operational impact based on the characterization and urgency of expected crew responses required to mitigate the operational impact. The outcome is a reproducible list of resulting alert levels for each crew response to mitigate the operational impact. The highest alert level of the crew responses to the operational impact then determines the alert level of the operational impact itself. This information is then stored in the alert database.

FIG. 1 depicts examples of an alert system 100 that prioritizes alerts for a vehicle, according to one aspect described herein. The alert system 100 may be used in an aircraft, boat, submarine, bus, military vehicle, and the like. In one aspect, the various components in the alert system 100 may all be disposed on the vehicle or executed by computing systems containing processors and memory. However, in other aspects, some of the components in the system 100 may be on the vehicle while other components are disposed in, or executed in, external locations (e.g., a data center or cloud computing environment). In that situation, the vehicle may have wireless connectivity to the external location (e.g., satellite or cellular network connectivity).

As shown, the system 100 includes an alert database 105 which stores alert events 110. In one aspect, the alert events 110 are deviations from normal operations and can include engine failure, low tire pressure, brake system failures, loss of autopilot, traffic warnings, severe weather, ice buildup on the wings, and the like. The alert events 110 can represent problems in any mechanical or electrical system. In one aspect, the alert events 110 are stored in the alert database before the vehicle becomes operational. For example, when designing the vehicle, the manufacture may identify the alert events 110 which are then stored in the alert database 105.

The alert events 110 can list actions 115 that should be performed in response to the alert events 110 being detected by the pilot or crew of the vehicle. For example, if the alert event is the loss of the hydraulic pressure in the brakes, the action 115 may be for the pilot to activate a manual braking system, divert to a larger airport, or use an ancillary system (e.g., reverse thrusters). The alert events 110 can have multiple actions 115 to be performed by the pilot or other crew members, or no actions. For example, some alert events 110 may be notifications that the pilot can use when piloting the vessel, such as when power steering is lost.

The system 100 generates a suggested alert (or initial) level 120 for the alert event 110. In one aspect, the suggested alert level 120 represents the operational impact of the alert on the vehicle on a particular operational phase or phases of the vehicle. For example, if the alert event 110 has the chance of causing harm to the vehicle or the people in the vehicle, the suggested alert level 120 may be higher than an alert event 110 with a low (or no) operational impact on the vehicle or the people in the vehicle. However, as discussed below, the operational impact an alert event 110 has on the vehicle can vary depending on the depending on the operational phase of the vehicle. That is, the alert level 120 is not assigned purely based on the severity of the of the alert but on whether a crew response needs to happen immediately and the type of crew response. For example, an alert indicating that the landing gear of an aircraft cannot extend can be assigned a different alert level when the plane is cruising (and the landing gear is not currently needed) then when the plane is landing where a crew response is immediately required. In other examples, a loss of pressurization in a compartment has a greater impact on a submarine that is currently submerged than one that is currently docked, or an issue with a braking system has less of an operational impact on an airplane that is cruising at altitude than one that is currently landing. Thus, the operational impact of an alert event 105 on the vehicle matters on the context of the vehicle—i.e., its current operational phase. Using the techniques below, the alert system 100 may assign a different alert level to an event based on the current context of the vehicle (e.g., the current flight phase of the aircraft).

The system 100 also includes an event monitoring system 125 which includes sensors 130 for monitoring mechanical, pneumatic, hydraulic, software, and electrical systems in the vehicle. The outputs of the sensors 130 are provided to an alert generator 135 (e.g., a hardware system, software module, or a combination of both) that determines whether one of the alert events 110 stored in the alert database 105 has occurred. For example, the alert generator 135 may collect criteria or thresholds for the alert events 110 that can be used to monitor the data generated by the sensors 130. If the criteria or thresholds are satisfied, the alert generator 135 can generate an alert notification. However, the aspects herein are not limited to any particular technique for identifying when an alert event has occurred in the vehicle.

When identifying an alert event 110 has occurred, the event monitoring system 125 transmits a notification to a contextualizer 140 (e.g., a hardware system, software module, or a combination of both) that identifies an operational phase 145 of the vehicle which is then used by an alert-level assignor 150 to assign an alert level to the alert event 110 in response to the current context of the vehicle. The operational phase 145 can be a particular operational phase of the vehicle. For an aircraft, the operational phase 145 (e.g., a flight phase) may be taxing, take off, climbing, cruising, landing, and the like. For a boat, the operational phase 145 may be docked, accelerating, cruising, being towed (e.g., by a tugboat), and the like. For a submarine, the operational phase 145 may be docked, submerging, accelerating, resting on the bottom of the sea floor, rising to the surface, and the like.

The alert-level assignor 150 can use the operational phase 145 of the vehicle to then select the alert level for the alert event 110. In this case, the assignor 150 can assign one of three alert levels—warning, caution, or advisory. It is assumed that warning is the highest alert level and advisory is the lowest alert level. While the aspects herein are discussed using these three alert levels, other alert systems may use more than three alert levels, or may use only two alert levels.

As an example, the operational phase 145 of a boat may be "docked". If the alert generator 135 detects an alert event 110 indicate the boat has an engine failure, this might be assigned the caution level. However, if the boat instead had an operational phase 145 of "cruising", the assignor 150 may assign the engine failure to the warning level. Other examples include "traffic" or "terrain" for submarines, boats, or space vessels where immediate corrective action to the travel path is required.

In one aspect, the alert database 105 may store the situations indicating when the suggested alert level 120 should be assigned. That is, before the vehicle has begun operation, the designer or manufacture may indicate when (i.e., during which phase) the alert event 110 has an operational impact on the vehicle. Continuing the previous example, the alert event 110 for the engine failure may indicate the alert event 110 has the suggested alert level 120 of "warning" when the operational phase 145 of the boat is accelerating, cruising, and deaccelerating. Thus, when the alert-level assignor 150 determines the operational phase 145 is not one of these listed phases, it reduces the alert level—e.g., assigns the alert event 110 to be a caution or advisory level. In this example, the alert assignor 150 can query the alert database 105 to determine which operational phases of the vehicle cause the alert event 110 to have an operational impact on the vehicle and then adjust the alert level in response to the operational phase 145 of the vehicle. Put differently, the operational impact of the alert event 110 depends on the current operational phase of the vehicle. This contextualization then permits the system 100 to set a custom alert level for the operational phase 145 of the vehicle.

The alert level set by the contextualizer 140 is then transmitted to the prioritizer 155 which prioritizes and outputs the current alert events 110 to a display 160. The display 160 can be a heads-up display, touch screen, tablet, smartphone, control panel, or any other computing device that permits a pilot or crew member to receive the alerts.

In one aspect, the prioritizer 155 prioritizes the alerts based on the assigned alert level. For example, FIG. 1 illustrates a graphical user interface (GUI) 165 where the vehicle has detected eight alerts events, Alerts 1-8. The prioritizer 155 has arranged the alert events in the GUI 165 such that the higher level alerts—i.e., the warning Alerts 1-3—are displayed at the top, while the middle level alerts—i.e., the caution Alerts 4-5—are displayed underneath, and the lower level alerts—i.e., the advisory Alerts 6-7—are displayed at the bottom. Thus, by simply glancing at the GUI 165, a crew member immediately knows which alerts should be handled first—i.e., the warning alerts. Thus, unlike prior solutions where the alerts are displayed based on the predefined, suggested alert levels 120 in the database 105, here, the alerts are assigned a dynamic alert level that changes as the operational phase 145 of the vehicle changes.

Further, GUI 165 illustrates that Alerts 1-7 have actions to be performed by a crew member in the vehicle, but Alert 8 does not. Thus, some alerts can have actions to be performed by the crew member while other alerts do not. For example, Alert 8 may simply state a condition of the vehicle such as a fluid level being low or it is time to perform preventive maintenance.

Prioritizing the Alerts 1-8 may be especially useful when multiple alerts are detected at once. For example, it may be the case where multiple systems or components may fail at once. As such, the display 160 may suddenly display multiple alerts at essentially the same time. Rather than simply ranking the alerts based on their suggested alert level 120 or based on when the alerts where detected, the system 100 can use the contextualizer 140 and the prioritizier 155 to rank or prioritize the alerts so the most critical alerts are disposed on top (e.g., the alerts assigned to the warning alert level). Thus, the pilot, driver, or crew member can immediately know which alerts should be addressed first without having to perform a self-evaluation of all the alerts. Further, the alerts in each alert level can also be prioritized.

Figure 2:
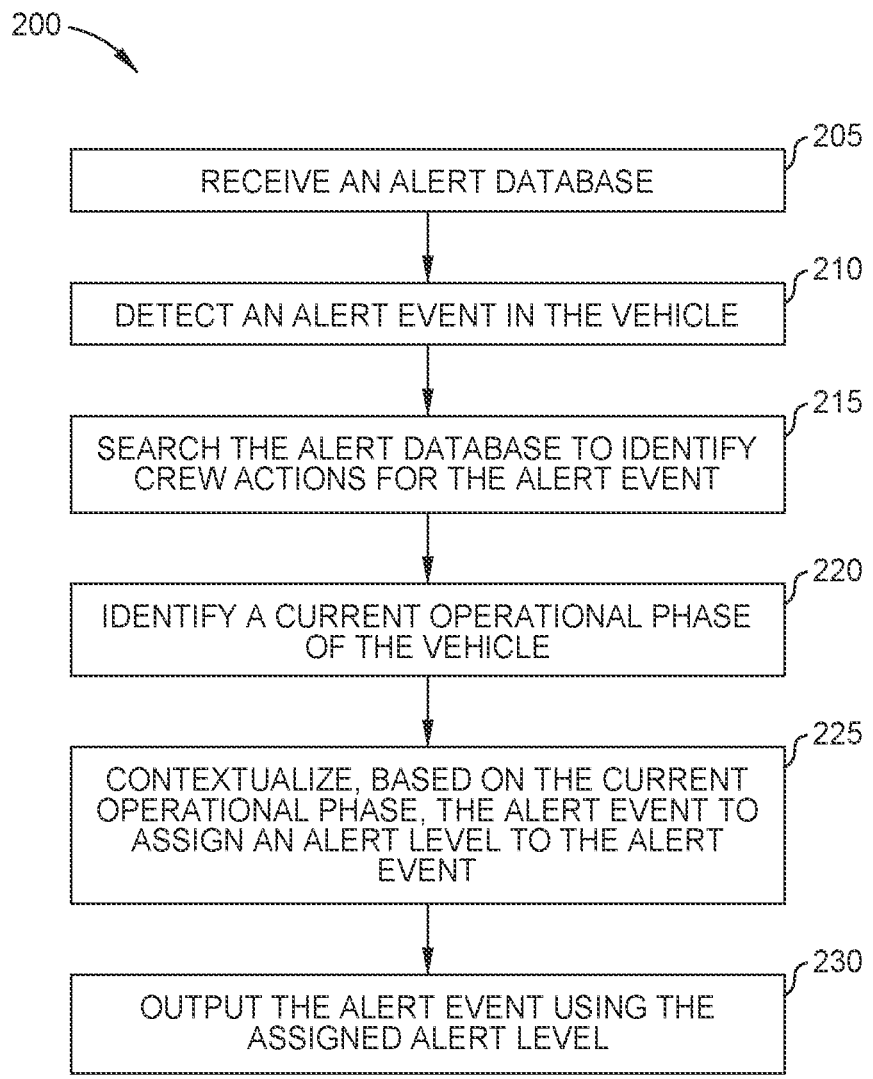
FIG. 2 is a flowchart for prioritizing alerts for a vehicle, according to one aspect described herein.

FIG. 2 is a flowchart a method 200 for prioritizing alerts for a vehicle, according to one aspect described herein. At block 205, the alert system (e.g., the alert system 100 in FIG. 1) receives an alert database (e.g., the alert database 105). The alert database can list alert events that can be detected on the vehicle. In one aspect, the alert events define situations that deviate from a normal or optimal operation condition in the vehicle. These alert events can be defined by the designer or the manufacture of the vehicle. The alert database can also provide actions or information that should be displayed to the crew of the vehicle when the alert is detected. For example, if the reverse thrusters in an aircraft fails, the alert database may list several actions the pilot should perform such as relying on wheel brakes or selecting a longer runway when landing.

The alert database can also indicate a suggested alert level of the alert events depending on the operational phase of the vehicle. For example, the alert database may indicate that an error in the reverse thrusters should be a WARNING alert (which requires immediate attention and immediate action) when the plane is taking off or landing. However, this then implies this alert may have a lower alert level (e.g., CAUTION alert level which requires immediate attention but subsequent action) when the operational phase (or flight phase) of the aircraft is different, such as taxing or cruising.

The details on populating the alert database is not described here, and instead is described in FIGS. 8 and 9 below.

At block 210, an alert generator in the alert system detects an alert event in the vehicle. In one aspect, the alert generator is software code that monitors sensor data in the vehicle to determine when criteria or a threshold for one of the alert events is met. For example, the alert generator may monitor a status signal of the reverse thruster system to determine whether it indicates this system is offline. In another example, the alert generator may monitor a velocity sensor to detect a low-speed condition. In another example, the alert generator may monitor a fluid pressure sensor to detect an alert related to a hydraulic system in the vehicle. These are just some of the different mechanical systems and electrical signals that can be monitored to detect whether an alert event has occurred.

At block 215, the contextualizer (e.g., the contextualizer 140 in FIG. 1) searches the alert database to identify crew actions for the alert event. These actions can provide instructions to solve the problem causing the alert, mitigate the repercussions of the alert, or provide instructions for activating a backup system. For example, if the braking system in an airplane fails, the action may instruct the pilot to select a longer runway to land, which may result in the pilot diverting the flight to a different airport. Other actions may instruct the crew members to change their behavior. For example, the loss of a power steering compensation system may mean the driver of the vehicle should avoid abrupt steering motions, or the loss of equipment for instrument flight may require the pilot to remain clear of clouds, or the loss or sonar may require a submarine pilot to remain in charted terrain. As such, the action may be a prompt to the driver or pilot to adjust how to steer or pilot the vehicle.

While many alerts can have corresponding crew actions such as those discussed above, some alerts may be informational alerts that do not ask the crew members to take an action or change their behavior (although these alerts can include an implicit action/question of "Does this alert have a negative impact on the vehicle somehow?"). For example, low hydraulic or pneumatic pressure may be displayed as an alert even though the crew members do not need to take any action at this time. The alert may then be flagged at a later time as a maintenance task.

At block 225, the contextualizer contextualizes, based on the current operational phase, the alert event to assign an alert level to the alert event. In one aspect, the contextualizer can again query the alert database to identify in what operational phases the actions corresponding on the alert should be performed immediately by the crew. That is, the alert database can indicate during which part of a flight phase an action for a particular alert should be addressed immediately. For example, the alert database may indicate that an alert in the hydraulic system used to lower the landing gear in an aircraft requires immediate action when the aircraft is preparing to land. However, immediate action is not required when the aircraft is taking off, climbing, or cruising. If the current flight phase (e.g., the operational phase) of the aircraft is landing, then the contextualizer assigns a higher-alert level to the alert just based on the immediacy of the action to avoid severity escalation of the non-normal situation. But if the aircraft is taking off, climbing, or cruising, the contextualizer assigns a lower-alert level.

In one aspect, the contextualizer lowers the assigned alert level to below the suggested alert level (i.e., downgrades the suggested alert level) in response to determining the alert event has an operational impact on a future flight phase but does not have a negative operational impact on the current flight phase of the aircraft. Continuing the example above, if the current flight phase of the aircraft is cruising but the alert event (e.g., a problem with the hydraulic system used to lower the landing gear) has an operational impact only when the plane is landing (i.e., a future flight phase), than the contextualizer lowers the alert level. One reasons for still outputting the alert during cruise is that the pilot still should know about the situation to potentially react with the decision to change the destination airport. However, if the current flight phase of the aircraft changes to landing and the alert event is still active, then the contextualizer can raise the alert level to the suggested alert level provided in the alert database.

Considering the context of the aircraft when assigning an alert level is advantageous since multiple alerts may occur at the same time. For example, the hydraulic system that lowers the landing gear may also power the ailerons of the aircraft. A problem in that system may trigger alerts for both the landing gear and the ailerons. However, if the aircraft is currently cruising, the alert for the ailerons may be assigned a higher alert level since they are used for steering the aircraft in the air, while the landing gear is not currently needed. Thus, prioritizing the aileron alert focuses the crew members' attention on the more important alert for the operational phase or flight phase of the aircraft. If the aircraft was landing, then both alerts may be assigned the same high priority level since both are used during that flight phase.

Further details regarding contextualizing alert events using the operational phase of the vehicle is described in more detail in FIGS. 5-7 below.

At block 230, a prioritizier outputs the alert event using the assigned alert level. If there are multiple alert events, the prioritizier can use the different alert levels assigned in block 225 to display the alert events according to their priority (e.g., the alert levels assigned the higher priority are disposed at the top of the alert list). In this manner, the alert events can be contextualized and then assigned alert levels so the events can be displayed in a prioritized manner. The alert events and any actions, information, or other desired description can then be output onto a display (e.g., the display 160 in FIG. 1).

The alert events within each alert level can also be prioritized (e.g., arranged in a particular order in the GUI). The alert events that, during contextualization at block 225, are downgraded or lowered may be further prioritized using the following prioritization hierarchy: (i) alert events that have a crew response that is not time-constrained, where execution is solely at the crew's discretion, (ii) alerts that have a future immediate crew response in a later flight phase (i.e., alerts that are in the warning level in a future flight phase) that is currently only theoretical, where the alert system cannot predict or does not yet know if there will be warning level alerts in future flight phases, (iii) alert events that have a future crew response in a later flight phase and require monitoring of flight attitude and trajectory parameters to determine the need and start of the execution of the crew response, or include a changed behavior to a task which includes flight path and trajectory control, (iv) alert events that have a future crew response in a later flight phase, and require monitoring of system parameters to determine the need and start of the execution of the crew response, or include a changed behavior to a task which includes system management, (v) alert events that have a future crew response in a later flight phase, and require monitoring of aircraft or flight deck configuration parameters to determine the need and start of the execution of the crew response, or include a changed behavior to a task which includes aircraft or flight deck configuration, (vi) alert events that have a crew response and require monitoring of external parameters to determine the need and start of the execution of the crew response, and (vii) alert events that do not have a future crew response.

In addition, the alert events in each alert level can be prioritized by the flight phase in which the operational impact exists with, e.g., the next flight phase having highest priority and the flight phase that is the furthest away having lowest priority. Often, the next flight phase depends on whether the flight proceeds as normal/planned or not. That is, if something is wrong, the next flight phase may be different than when the flight proceeds as normal. When the next flight phase can be a normal or a non-normal flight phase, then the alert system can prioritize alerts in the same alert level with operational impacts in the (future) normal flight phases higher than the alerts with operational impacts in a (future) non-normal flight phase.

The alert events in each alert level can also be prioritized based on their time of appearance where newer alerts have higher priority than older alerts, or vice versa.

In one aspect, the alert system gives the highest priority to any alert event that require immediate crew awareness and a crew response. Alert events that have their alert status downgraded in response to contextualization at block 225 may be given the second highest priority. This supports a potential transition from a downgraded, advisory alert to a higher alert level (caution or warning) in case the operational impact continues to exist and has not yet been mitigated when the flight phase transitions from the currently active flight phase to the next flight phase. Further, the system can assign any alerts that do not have a time-constraint pilot response, or no pilot/drive response associated (i.e., awareness only) the lowest priority in the alert level.

For a correct understanding and interpretation of alerts by the flight crew, the alert system communicates to the crew in the vehicle if an low-level alert (e.g., advisory alert) is relevant in the currently active operational phase, in a subsequent operational phase that is also considered "currently active" (per the combined blocks shown in FIG. 5 below), or if it is only relevant in a subsequent flight phase. This can be communicated via design options. This also enables the alert system to communicate to the crew of the vehicle that there might be operational impacts only in non-normal flight phases in the future, which might never exist, if the mission never transitions to a non-normal flight phase.

Figure 3:
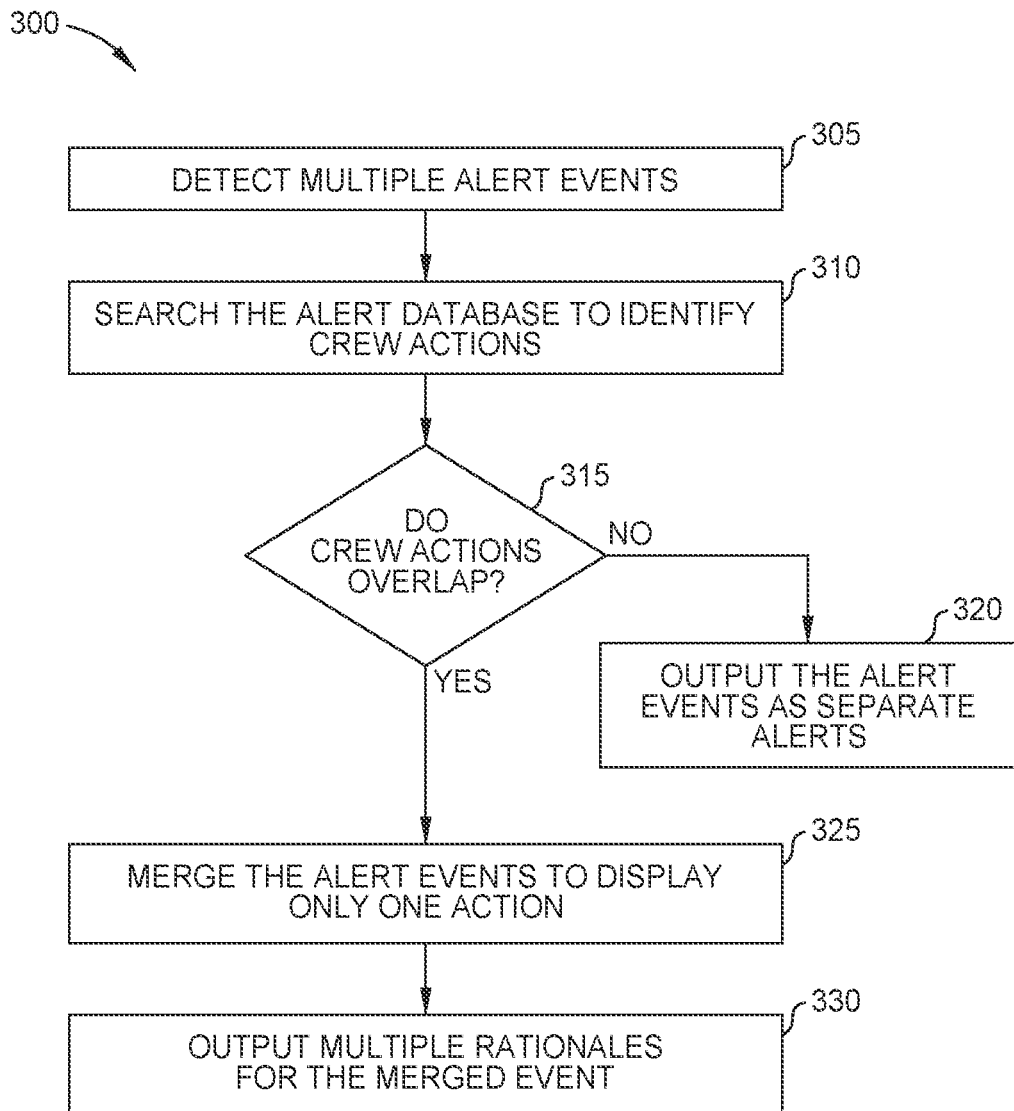
FIG. 3 is a flowchart for merging alerts, according to one aspect described herein.

FIG. 3 is a flowchart of a method 300 for merging alerts, according to one aspect described herein. In other solutions, a manufacturer or vehicle designer hard-codes the alerts that can be combined into merged alerts. That is, the manufacturer or designer would explicitly indicate which two (or more) alerts could be combined into a single alert. In contrast, the method 300 is a rule-based approach to combining alerts. Thus, the manufacturer no longer has to review the alert events and manually identify which alerts can be merged. Instead, the alert system can be programmed as described below to automatically identify alert events that can be merged.

At block 305, the alert generator detects multiple alert events. These alert events may occur at substantially the same time, or one alert may already be displayed by the alert system before a second alert event is detected by the alert generator.

At block 310, the contextualizer searches the alert database to identify the crew actions corresponding to the multiple alert events. For example, the operational impact of a first alert event in the current flight phase (e.g., cruising) may require the flight crew to perform flight re-planning. Similarly, the operational impact of a second alert event in a future flight phase (e.g., landing) may also require the flight crew to perform flight re-planning. In another example, the first alert may be the loss of autopilot which requires the pilot to fly manually. Similarly, the second alert may be the loss of a secondary flight mode which also requires the pilot to fly manually.

At block 315, the contextualizer determines whether the crew actions (i.e., crew response) overlap. That is, the contextualizer determines whether at least two alerts have the same crew response. In the examples above, two of the alerts have the same crew response—i.e., "flight re-planning" and "flying manually."

If there are at two (or more) alert events with the same crew actions, the method 300 proceeds to block 325 where the alert events are merged. In one aspect, the prioritizier outputs just one alert with only one crew action. For example, the prioritizier may output "Perform flight re-planning" next to a single alert in the display. Thus, instead of the crew seeing two alerts, they would see only one alert with one action.

In one aspect, the alert events may have multiple actions, but only some of the actions overlap. In that case, the prioritizier may merge the common action or actions but separately display the differing actions.

At block 330, the prioritizier outputs multiple rationales for the merged event where the multiple rationales describe the plurality of alert events that form the basis of the merged alert event. For example, when displaying the merged alerts along with the shared crew action (or actions), the display may include an indication that the alert is a merged alert or a combined alert. At the bottom of the alert list (or accessible by a button), the display can output the multiple rationales for the alert. For example, the rationales can list the two (or more) alerts that were combined, or describe the multiple system failures that prompted the same action. In this manner, the most important information (i.e., the crew action) is displayed prominently on the display but elsewhere on the display the crew members can view or access the rationale or basis for the multiple alerts if they desire.

Returning to block 315, if the multiple alerts do not have a combined crew action the method 300 instead proceeds to block 320 where the prioritizier outputs the alerts as separate alert events in the display.

Figure 4:
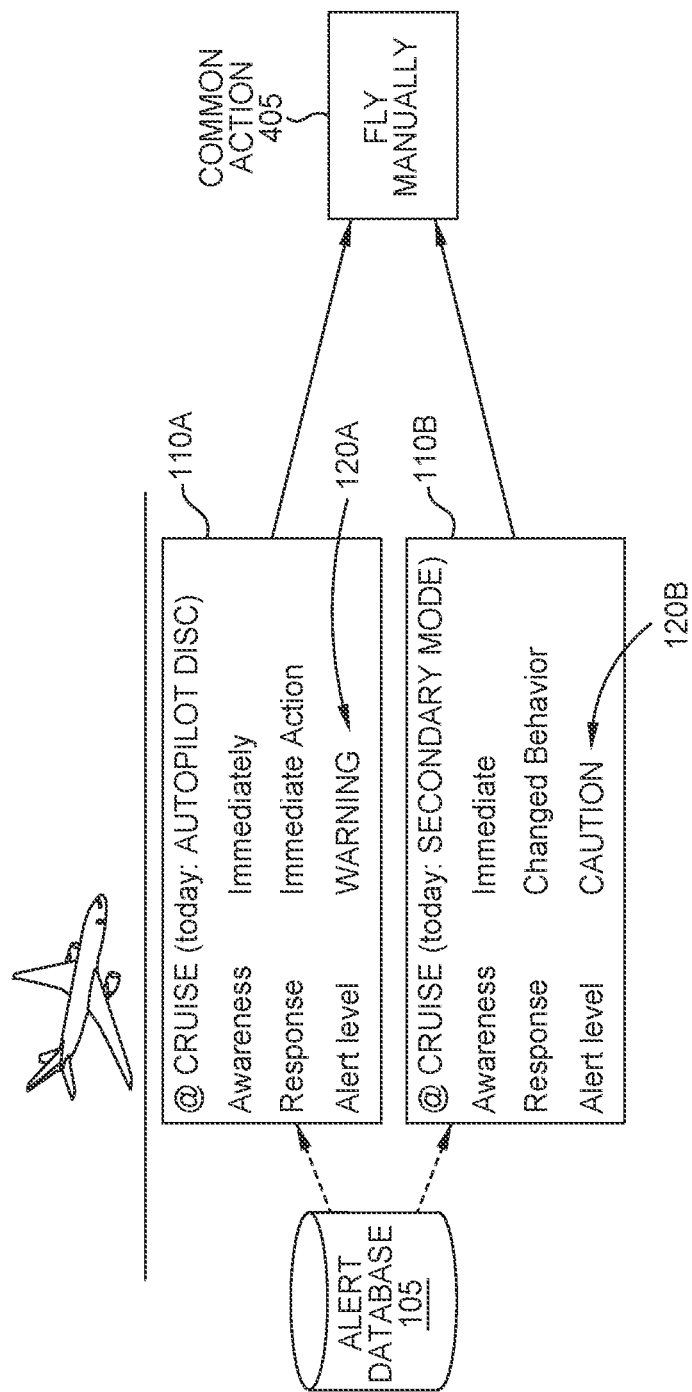
FIG. 4 depicts an example of merging alerts, according to one aspect described herein.

FIG. 4 depicts an example of merging alerts, according to one aspect described herein. FIG. 4 illustrates the alert database 105 and two alert events 110 stored therein. The alert event 110A corresponds to an error in the autopilot system while the alert event 110B corresponds to an error in the secondary mode used to assist the pilot in steering the aircraft. The alert events 110 store an awareness descriptor indicating when the crew should be made aware of the alert, a response descriptor indicating when the crew should perform a corresponding crew action (or crew response), and suggested alert levels 120A and 120B. In this example, the alert event 110A has a higher alert level (i.e., warning) than the alert event 110$b$ (i.e., caution).

The alert events 110A and 110B have a common action 405—i.e. flying manually. That is, the alert database 105 can store the actions corresponding to the two alert events 110 and use the method 300 in FIG. 3 to determine whether the alert events 110 should be merged. In this example, because both of the alert events 110A and 110B have the common action 405, the alert system can merge the alerts. Thus, instead of outputting two alerts, the prioritizier can output one alert with the common action 405 along with any other actions that are not shared by the alert events 110A and 110B.

Contextualization

As discussed above, operational impacts of an alert event may exist only in a future operational phase (e.g., a future flight phase) and not in the current operational phase of the vehicle. To accommodate for knowledge about future operational phases, contextualization removes immediacy of crew responses by lowering the alert levels when those crew responses should be performing in the future, and it is enough to make the flight crew aware now, during the current flight phase, before reaching the flight phases in which the operational impact exists.

For example, in the flight phases "initial approach" and "final approach", the aircraft requires the landing gear to be extendable, which is defined as a constraint. Due to a hydraulic issue during cruise, the aircraft may already know that the landing gear will not be extendable with hydraulic power, and the crew should use the electric backup or switch to using gravity extension. If the hydraulic failure occurs in the final approach, this operational impact and resulting crew response (changed behavior) would result in a caution level alert (immediate awareness, subsequent changed behavior). However, if the hydraulic failure occurs earlier, e.g., during cruise, then the alert may be lowered (downgraded) to advisory, as there is no immediacy involved before the aircraft switches to the "initial approach" and "final approach" flight phases.

One advantage of contextualization is to make the crew of the vehicle aware of operational impacts that may require a crew response or action in the future, but is output now to give the crew time to prepare. As such, contextualization reduces surprise effect, as alert levels may be increased gradually if no crew response is taken. That is, contextualization can adjust alert levels of operational impacts not existing, or are not relevant, in the current operational phase. These re-evaluated alerts are then inserted into the alert list as discussed above in the method 200.

In one aspect, contextualization does not lower the alert level for alert events that have operational impacts that exist in the currently active operational phase. Further, contextualization does not lower the alert level for alert events which have operational impacts in a future flight phase and the current flight phase (independent of the alert level in the current and in the future operational phases). These alerts are already communicated to the crew in the current operational phase. For example, if an alert event has the alert level of caution in the current operational phase but a lower alert level of advisory in the next (future) flight phase, the alert event is outputted in the current operational phase with the caution alert level. Moreover, if the alert system does not know (or cannot reasonably predict) whether an alert event has an operational impact on a future operational phase, then it will not lower the suggested alert level. Further, if the operational impact describes a status of the vehicle and not a capability then the alert system may not adjust the suggested alert level. For example, while taxing, the flaps may not be in the takeoff configuration because the aircraft should taxi to a de-icing pad first. The constraint "flaps in takeoff position" which exist in the next flight phase (e.g., "takeoff roll") is therefore violated and an operational impact is created. However, this may only be alerted once the takeoff phase start to avoid unnecessary warnings. In another example, after gear retraction during the departure phase the aircraft is no longer in the required configuration for the landing phase (gear down). This operational impact might not be alerted during the flight.

Figure 5:
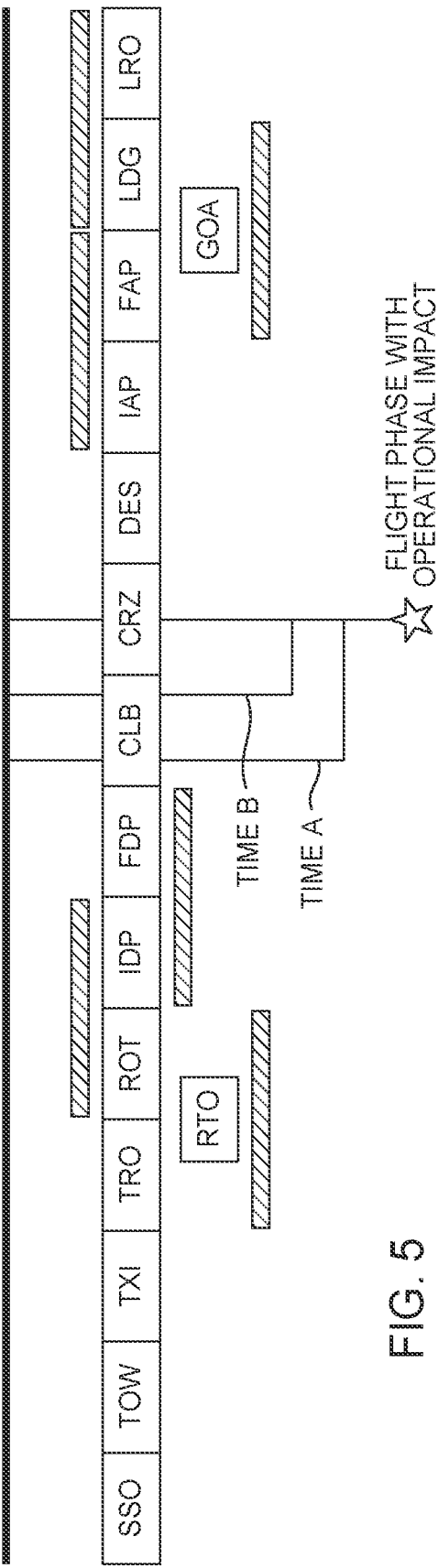
FIG. 5 illustrates on example of contextualizing alert events, according to one aspect.

FIG. 5 illustrates on example of contextualizing alert events, according to one aspect. FIG. 5 illustrates various flight phases which are defined according to Table 1. However, the flight phases in Table 1 are a non-limiting list of potential flight phases, and in other aspects, additional or fewer flight phases may be defined. Further, the aspects herein can apply to operational phases of other vehicles besides aircraft. For example, water vessels may have operation phases such as diving, floating, or docking while busses may have operational phases such as driving, passenger loading, reversing, and maintenance.

TABLE 1

| Flight Phase | Definition |
| --- | --- |
| Taxi (TXI) | Pushback to Takeoff |
| Takeoff (TRO) | Takeoff power to flaps retracted |
| Climb (CLB) | Flaps retracted-to-Level flight |
| Cruise (CRZ) | Level flight-to-Reduce altitude for landing |

TABLE 1-continued

| Flight Phase | Definition |
| --- | --- |
| Descent (DES) | Reduce altitude for landing-to-Initiation of flaps |
| Landing (LDG) | Initiation of flaps to taxi |

In FIG. 5, contextualization is applied to alerts that have operational impacts that exist in the next flight phase and the next flight phase starts more than a predefined time period in the future (e.g., three minutes). The bars in FIG. 5 with the vertical hashing indicate flight phase pairs that are considered as currently active flight phases (as mentioned in block 230 in the method 200) while the bars with the slanted hashing indicate the predefined time period. Time A indicates a time period where the operational impact exists only in the next flight phase and the next flight phase starts more than the predefined time period in the future. That is, Time A occurs in CLB flight phase but the operational impact occurs in the next flight phase, the CRZ flight phase. Further, Time A is more than the predefined time limit from the start of the CRZ flight phase. As such, if the alert event is detected at Time A, then contextualization is performed when assigning an alert level to the alert event. In one aspect, the alert system lowers or downgrades the alert level of the alert event.

In contrast, while Time B occurs in the CLB flight phase, it occurs less than the predefined time period from the CRZ flight phase. As such, if the alert event is detected at Time B, then contextualization is not performed when assigning an alert level to the alert event. In that case, the alert event may be assigned the suggested alert level (e.g., a default alert level) that is stored in the alert database.

Figure 6:
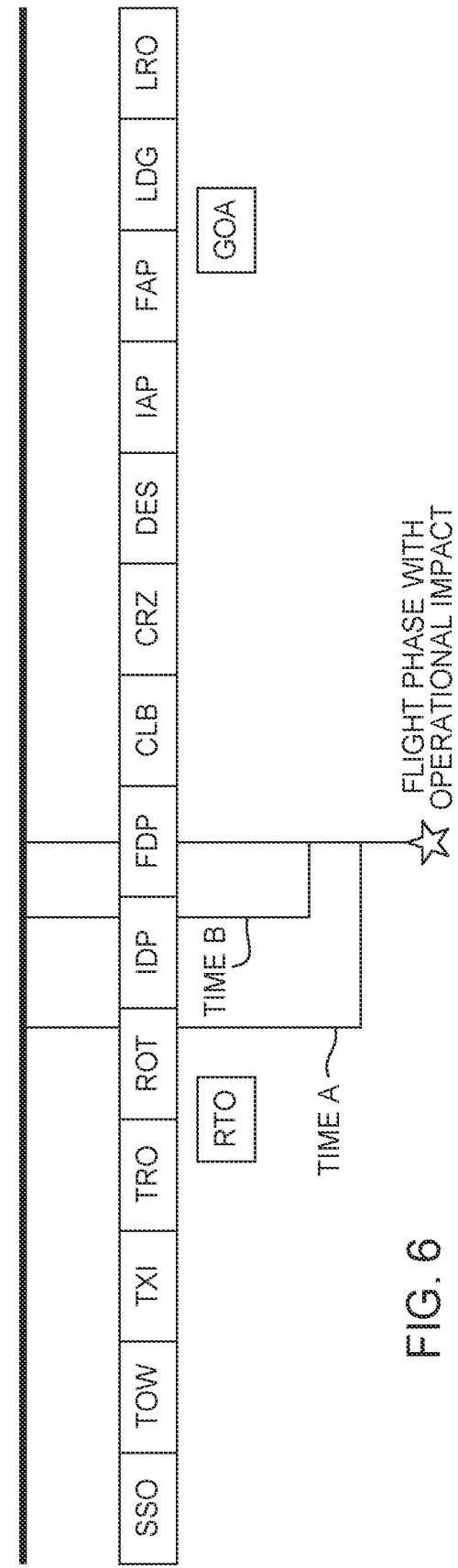
FIG. 6 illustrates on example of contextualizing alert events, according to one aspect.

FIG. 6 illustrates on example of contextualizing alert events, according to one aspect. FIG. 6 illustrates another parameter that may be considered when determining whether to perform contextualization. Here, contextualization is applied when the operational impact of an alert exists at least two flight phases in the future. Time A indicates a time period where the operational impact of a detected alert does not impact the current operational phase (ROT), nor does it impact the next phase (IDP) but it does impact the subsequent phase (FDP). As such, if the alert event is detected at Time A, then contextualization is performed when assigning an alert level to the alert event. In one aspect, when determining if the flight phase is at least two flight phases in the future, the alert system may view the flight phases individually and not grouped together, but this is not a requirement.

Time B, in contrast, indicates a time period where the operational impact of a detect alert does not impact the current operational phase (IDP) but it does impact the next phase (FDP). Because the operational phase that is impacted by the alert event is not at least two flight phases from the current flight phase, if the alert event is detected at Time B, then contextualization is not performed when assigning an alert level to the alert event. The alert event may be assigned the suggested alert level that is stored in the alert database.

The alert system can use either one of the criteria illustrated in FIGS. 5 and 6 to determine whether to perform contextualization. Or the alert system may perform contextualization if either of the criteria illustrated in FIGS. 5 and 6 are satisfied. Or the alert system can use some other combination of criteria to determine when to perform contextualization.

Contextualization removes the aspect of immediacy from an alert by selecting a lower alert level. For example, a caution level alert (immediate awareness) in a future flight phase can be contextualized to an advisory level alert (awareness). The crew should have awareness that a condition might require immediate awareness in the future, but due to contextualization there is no longer an immediacy associated with the alert when it is displayed. In another example, a warning level alert (immediate awareness and immediate action) in a future flight phase can be contextualized to an advisory level alert in the currently active flight phase. The (future) existence of most operational impacts that result in a warning level alert cannot be reliably predicted into the future (examples: engine fire, overspeed, engine damage), hence the flight crew cannot pre-execute an action in an earlier flight phase. However, there may be a few exceptions, such as a predicted terrain impact in a future flight phase due to a wrong flight plan. In these cases, the crew can only execute a crew response of type "Flight Re-planning Evaluation/Flight Re-Planning" in the currently active flight phase, which has no immediacy but can be assigned an advisory level alert.

For an alert event with an advisory level alert in a future flight phase, it can be contextualized to an advisory level alert (awareness) in the currently active flight phase. There is no immediacy involved, neither in the awareness nor in the action crew responses. Table 2 provides a summary of performing contextualization for alert events.

TABLE 2

| Alert level that the operational impact would have in the future flight phase | Assigned level after performing contextualization | Rationale for the transition |
| --- | --- | --- |
| ADVISORY | ADVISORY | No change (no immediate crew response required even when the operational impact exists in the future) |
| CAUTION | ADVISORY | Downgrade to ADVISORY, as the aspect of immediacy is removed. The crew has a much longer time to prepare for the situation, as during the time of alert the operational impact does not yet exist. |
| WARNING | ADVISORY | Downgrade to ADVISORY, as the aspect of immediacy is removed. The crew response of type action can only be executed when the operational impact exists. The crew has a much longer time to prepare for the situation, as during the time of alert the operational impact does not yet exist. Until then, the crew can only execute a crew response of type "Flight Re-planning Evaluation/Flight Re-planning" (which is, by definition, an ADVISORY level). |

Figure 7:
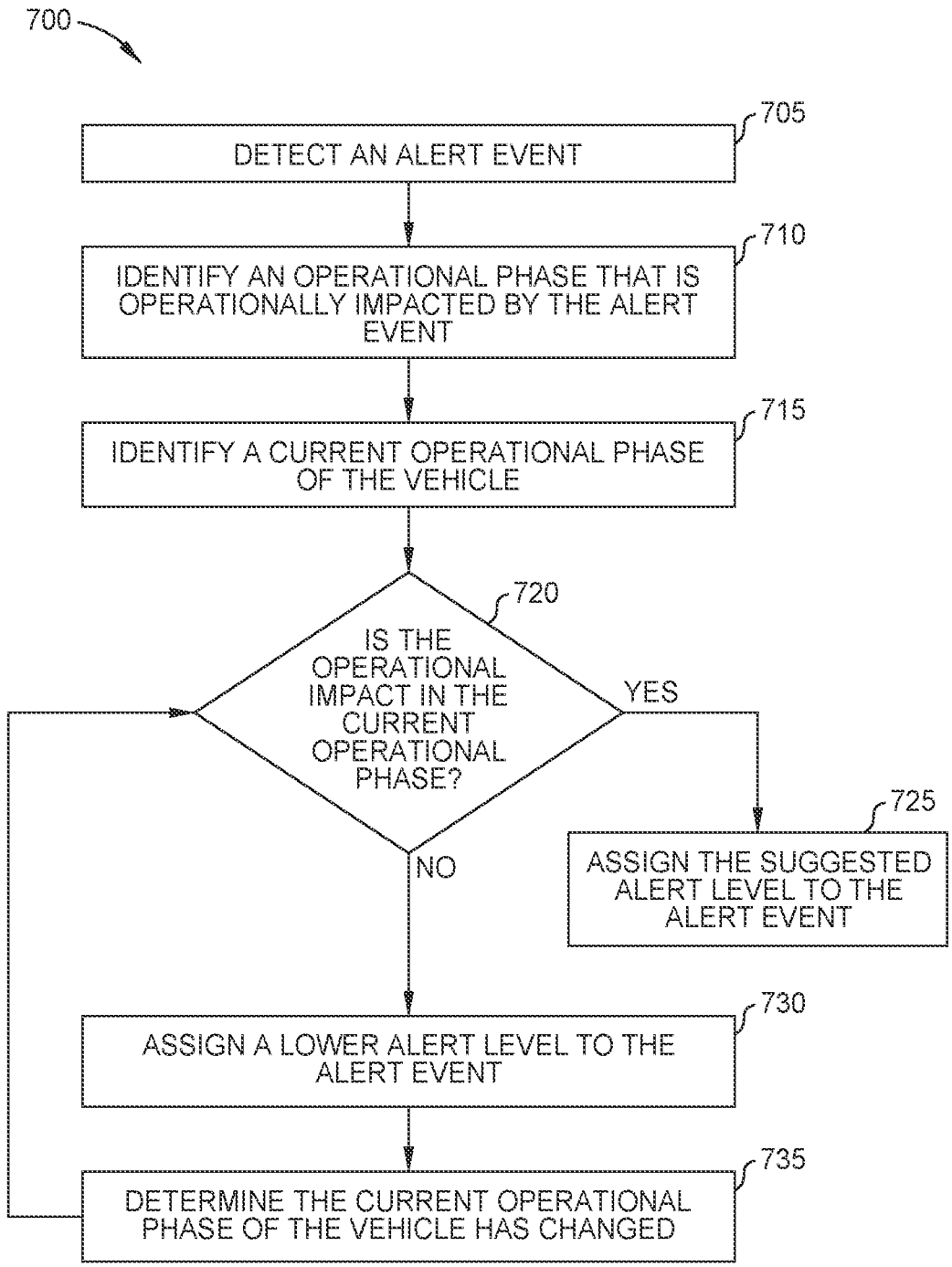
FIG. 7 illustrates a flowchart for contextualizing alert events in a vehicle, according to one aspect.

FIG. 7 illustrates a flowchart of a method 700 for contextualizing alert events in a vehicle, according to one aspect. At block 705, the alert generator detects an alert event. This can use any of the techniques described at block 210 of the method 200.

At block 710, the contextualizer identifies an operational phase that is operationally impacted by the alert event. For example, the contextualizer may query the alert database to identify which operational phases of the vehicle are operationally impacted by the alert event. This list may have been populated by the manufacturer or the designer of the vehicle and stored in the alert database before the vehicle began its trip or flight. The alert database may indicate the operational phases in which the alert event has an operational impact as well as the phases the alert event does not have an operational impact. Or the alert database may list only the operational phases in which the alert event has an operational impact.

At block 715, the contextualizer identifies a current operational phase of the vehicle. This can be identified by querying a flight or trip controller, from sensor data, or may be provided by the driver or the pilot.

At block 720, the contextualizer determines if the operational impact of the alert event occurs in the current operational phase. In one aspect, the contextualizer determines whether the first operational phase is a future operational phase relative to the current operational phase of the vehicle.

If the operational impact of the alert occurs in the current operational phase, then the method 700 proceeds to block 725 where the prioritizier assigns the suggested alert level of the alert event stored in the alert database to the alert event.

However, if the operational impact of the alert event is in a future operational phase, the method 700 proceeds to block 730 where the contextualizer assigns a lower alert level to the alert event. That is, the contextualizer downgrades the suggested alert level in the alert database.

In one aspect, the contextualizer may use the criteria discussed in FIG. 5 to determine when to lower the alert level. There, an alert event is downgraded when the alert has operational impacts that exist in the next flight phase and the next flight phase starts more than a predefined time period in the future (e.g., three minutes).

In one aspect, the contextualizer may use the criteria discussed in FIG. 6 to determine when to lower the alert level. There, an alert event is downgraded when the operational impact of an alert exists at least two flight phases in the future. The contextualizer can evaluate one, or both of the criteria shown in FIGS. 5 and 6, or can use some other criteria to determine when to downgrade the alert level for the event.

At block 735, the alert system determines that the current operational phase of the vehicle has changed. For example, a boat may have been getting towed by a tug but has now begun operating on its own power, or an aircraft that was previously taxi has now begun to takeoff. The alert system can revisit the alert events that are still pending (e.g., have not been resolved) to determine whether to change the alert event. If the alert event now has an operational impact on the new, current operational phase, then the method 700 proceeds to block 720 where the suggested alert level is assigned to the alert event. Doing so raises the alert level from the downgraded alert level to the suggested alert level (e.g., from the advisory level to the caution or warning level). Put differently, each time the operational phase of the vehicle changes, the alert system can revisit the criteria used to contextualize the alert events (e.g., the criteria shown in FIGS. 5 and 6) to see if the alert events still satisfy that criteria, and if not, change the alert level of the alert events to the one listed in the alert database.

Generating the Alert Database

Previous alert systems used a static database which contains all pre-defined alerts with their characteristics. These include conditions when the alert is issued, the suggested alert level (e.g., warning, caution, advisory level), and alert text. The static database can be updated over the years. Incidents and accidents, insight from the operational world, regulatory mandates, and customer enquiries can be used to adjust the suggested alert levels of individual alert event, and alerting conditions can be added. However, the manufacturer and other entities (e.g., government regulators) often have different understandings of which alert level each alert should have when preparing a new aircraft for certification. A general lack of transparency and means to proof correctness and completeness contribute to this issue. Thus, the previous way of populating the alert database is cumbersome and is difficult to vet.

As discussed above, the alert database can instead be generated to provide information that can be used to contextualize the alert events to remove, where appropriate, the immediacy of alert events that have operational impacts on future operational phases of the vehicle. The following describes techniques that are applied to derive the alert level for an operational impact based on the characterization and urgency of expected crew responses required to mitigate the operational impact. In one aspect, a multi-step guiding questionnaire is used to help subject matter experts evaluate every operational impact and constraint violation combination for expected crew responses, their characteristics, and their urgency. The outcome is a reproducible list of resulting alert levels for each crew response to mitigate the operational impact. The highest alert level of the crew responses to the operational impact then determines the alert level of the operational impact itself. This information is then stored in the alert database.

Figure 8:
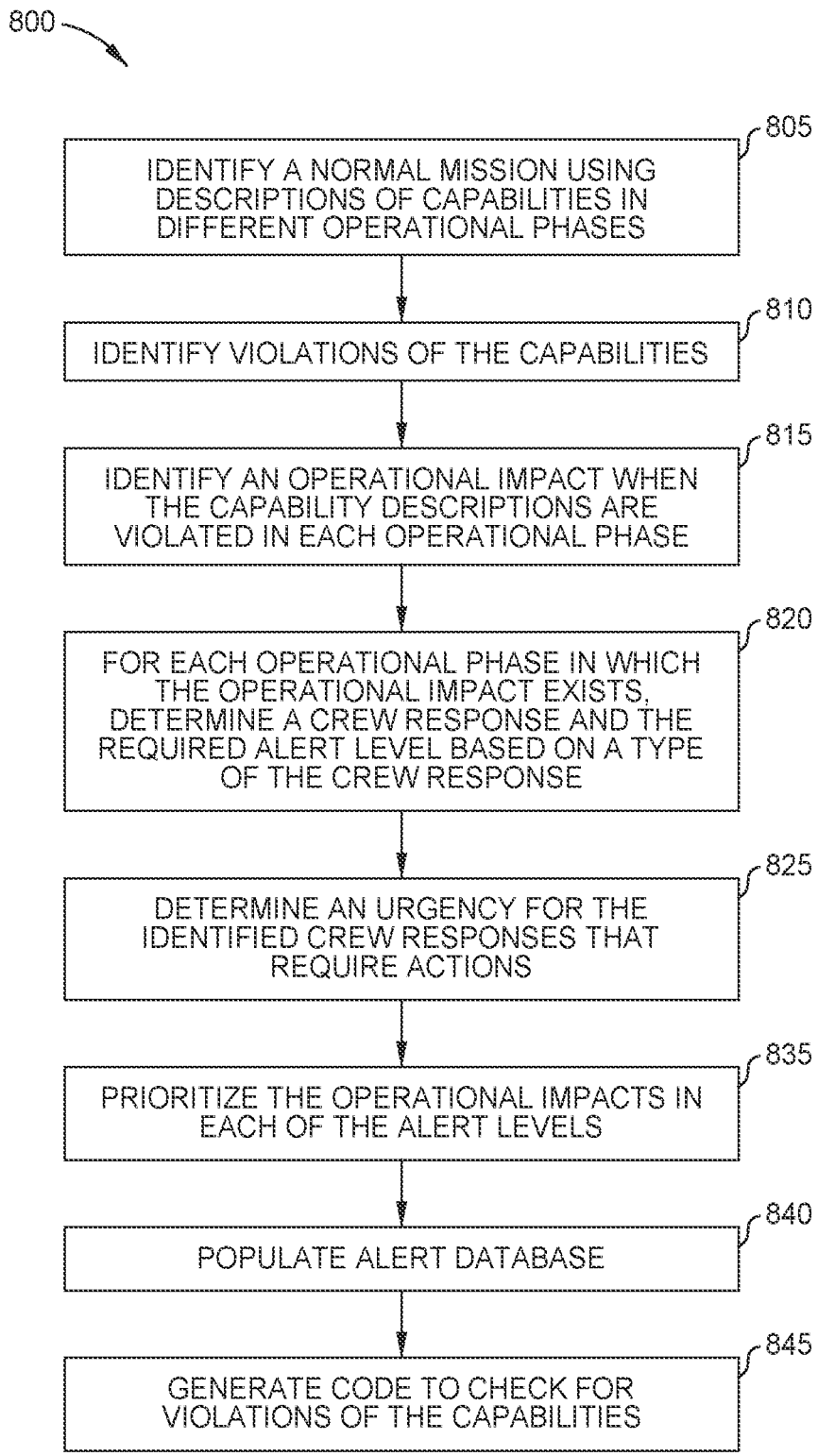
FIG. 8 is a flowchart of a method for generating an alert database, according to one aspect.

FIG. 8 is a flowchart of a method for generating an alert database, according to one aspect. At block 805, a subject matter expert, or a team of subject matter experts, identify a normal mission of the vehicle using descriptions of capabilities in different operational phases. For an aircraft, the team of experts may include the designers of the various components of the aircraft (e.g., propulsion system, landing systems, flight controls, autopilot systems, etc.). For a bus, the team of experts may include the designers of the various components of the bus (e.g., propulsion system, braking systems, steering controls, etc.). For a ship, the team of experts may include the designers of the various components of the ship (e.g., propulsion system, radar systems, sonar system, steering controls, etc.).

The expert(s) can identify a normal mission such as a commercial flight from one airport to another, a trip from one bus depot to another, or a voyage from one port to another. The experts can describe the different capabilities or functions the vehicle should have at the different operational phases of the normal mission. An example of two capabilities are shown in FIG. 9.

Figure 9:
FIG. 9 illustrates capabilities of an aircraft during a mission, according to one aspect.

FIG. 9 illustrates capabilities of an aircraft during a mission, according to one aspect. In this example, the mission is defined as a commercial flight between two airports. The mission is divided into five flight phases (e.g., five operational phases) that include taxi, takeoff, cruise, approach, and landing. However, as shown in FIGS. 5 and 6, the mission may include other phases than what is shown in FIG. 9.

The aircraft capabilities in FIG. 9 are autoland 905 and acceleration 910. Other capabilities could include reverse thrust, landing gear extraction/retraction, autopilot, secondary mode for steering, and the like. The system experts can identify tens, hundreds, or thousands of different capabilities of the aircraft that are used to perform a normal mission.

FIG. 9 also illustrates the relationship of the capabilities with the flight phases in the mission. In this case, the autoland capability 905 is used during the approach and landing phases, but not the other three phases. The acceleration capability 910 is used in all the phases, but with different constraints. Namely, acceleration can be provided by one engine during the taxi phase but two engines are considered normal during the other four phases (assuming the aircraft has only two engines). Thus, FIG. 9 illustrates listing the capabilities used during a normal mission as well as providing constraints describing the relationship between the capabilities and each flight phase of the normal mission. For example, the constraints for the autoland capability 905 is that it is available in the approach and landing phases. The constraints for the acceleration capability 910 is that at least one engine is available during the taxi phase and that both engines are available during the other four phases.

Returning to the method 800, at block 810, the experts identify violations of the capability descriptions that cause the vehicle to deviate from the normal mission in at least one of the operational phases. As discussed in FIG. 9, the capabilities are violated if the airplane cannot use the capability in a normal manner at one or more flight phases. For example, even though the autoland is used during taxi, takeoff, and cruise, it still might be a violation of the autoland capability if the system is not available during those phases. However, in another aspect, the autoland capability being unavailable during taxi, takeoff, and cruise may be not be deemed a violation of the autoland capability since it is never used during those flight phases. Thus, the experts can evaluate each capability at each flight phase to determine what situations result in a violation of the capability.

At block 815, the experts identify an operational impact when the capability descriptions are violated in each operational phase. Again using FIG. 9, the experts can determine the operational impact on the plane if the capability description is violated during each flight phase. For the autoland capability, even assuming the expert defines it as a violation for this capability to not be available during the taxi, takeoff, and cruise, there is no operational impact on the aircraft since the autoland capability is not used during these phases. In contrast, if the autoland capability is not available during the approach and landing phases, this does have an operational impact on the aircraft since the capability is used during those phase. In this case, the experts may define the operational impact as forcing the pilot to land the aircraft manually. Similarly, with the acceleration capability, if no engines are available while taxing, or both engines are not available during takeoff, cruise, approach, and landing, this has an operational impact on the aircraft, which can be defined by the experts. For example, the operational impact may be losing the ability to steer the aircraft (if taxiing) or losing thrust during takeoff, cruise, approach, and landing. In this manner, the experts can identify whether a violation of the capability does, or does not, have an operational impact on each operational phase of the mission. Further, the experts can define the operational impact using free text or by using predetermined selections.

At block 820, for each operational phase in which the operational impact exits, the system expert determine a corresponding crew response and the required alert level based on the type of the crew response. That is, because the experts have identified in which of the operational phases the violation of the capability has an operational impact on the vehicle, the experts can also identify the crew responses to the operational impact.

In one aspect, the method 800 includes asking yes or no questions to identify the crew response and the required alert level based on the type of crew response. For example, if the expert answers yes to the first question, then the system assigns a crew response of type "Mission Re-planning Evaluation/Mission Re-planning" for that operational phase.

For each crew response of the type "Changed Behavior", the system may ask questions to categorize the crew response such as when crew responses that are only expected when multiple independent constraints are violated, thus requiring a crew response (typically required when a protection or compensation system fails, thus requiring the crew to change behavior when the aircraft gets into a situation that the failed system would normally resolve/mitigate without explicit crew involvement). An example of this is when the autopilot fails which requires the crew to fly manually or when the yaw damper function fails.

In contrast, other questions may be used to determine that no crew response is required to mitigate or remedy the operational impact of the violation on a particular operational phase. Or, if the expert answers no to all the questions above, then no crew response is assigned as a default.

It is possible that an operational impact of a violation includes multiple crew response types, e.g., all three of the "Mission Re-planning Evaluation", "Changed Behavior", and "Action" crew response types. For example, an operational impact may require an action "manual flight" (new task) as well as "changed behavior" to "manual flight" (e.g., to avoid abrupt control inputs).

In one aspect, as a check, the subject matter experts are asked to review the identified crew responses of all the types of crew response once the first step of the evaluation is complete to determine whether there is a downstream effect on another operational impact. This expert can list immediate (direct) downstream effects. Crew response to mitigate downstream effects of the operational impacts may be considered separately. An example includes, due to a loss of voted airspeed, the flight control mode switches from Primary to Secondary. As a consequence of the secondary control mode, the autopilot disconnects. Crew response (action) "manual flight" should be considered as a response to operational impact "reduced automation support" (autopilot disconnect), but not to "Reduced Safety Margins" (switch of control mode) or "Air Data unreliable" (loss of voted airspeed).

In one aspects, the types of crew response determined at block 820 may be preassigned an alert level. For example, the "Mission Re-planning Evaluation" type of crew response may always be assigned the advisory alert level while the "Changed Behavior" type of crew response may always be assigned the caution alert level. In contrast, the "Action" type of crew response may be further evaluated at block 825 to determine its alert level based on action characteristics such as urgency and pre-conditions.

At block 825, the expert determines an urgency for the identified crew response that require actions—i.e., "Action" type crew responses. To determine alert level for these types of crew responses, the system can ask if there is a risk of escalation. If "yes", then the warning alert level is assigned to the corresponding operational impact. Examples of operational impacts that may be assigned warning level crew responses include over speed situations, stall situations, fire, terrain, warning, degradation of landing performance during approach, etc.

However, a caution alert level is assigned to the operational impact if the answer is yes to a question asking whether parameters should be monitored. The caution alert level represents providing immediate awareness to the crew, timely start of monitoring, and potential subsequent crew response at a later time. Further, if the expert answer yes to this question, sub-questions may be asked to determine if the crew response is changing pitch attitude, altitude, speed, or navigational guidance. Another sub-question could determine whether the crew response requires monitoring autopilot modes, radios (tuning), engine state, and the like.

An "Action" type crew response may be assigned the advisory alert level if the expert answers yes to a question to monitoring external parameters. These external parameters can include weather in the vicinity of the aircraft, a situation at an airport, or air traffic control. In one example, the crew response is neither required immediately to avert severity escalation, nor does it require monitoring of parameters to determine the need/execution start time. The crew response is therefore at the crew's discretion.

If an operational impact has multiple crew response types with different assigned alert levels, the final alert level of the operational impact may be selected as the highest alert level of the crew response. That is, based on the expert answering the questions above, the operational impact may result in both an "Mission Re-planning Evaluation" type crew response assigned the advisory alert level and an "Action" type crew response assigned the warning alert level. The final alert level for the operational impact is the higher alert level—i.e., the warning alert level. Thus, in this example, the operational impact for each operational phase for each violated capability description is assigned only one alert level, even if the operational impact corresponds with multiple different types of crew responses.

The questions and examples above describe techniques for identifying crew responses and the types of those crew responses to operational impacts in each operational phase when a capability description is violated. Further, using the crew response types, the alert system can assign an alert level to the operational impacts—e.g., advisory, caution, or warning. These assigned alert levels can correspond to the suggested alert levels 120 in the alert database 105. That is, the alert level assigned at blocks 820 and 825 of the method 800 can be contextualized using the methods 200 and 700 and potentially lowered based on the current operational phase of the vehicle.

At block 835, the alert system prioritizes the operational impacts in each of the alert levels. That is, the alert system can prioritize the operational impacts within the same alert level. For example, to prioritize the operational impact that requires the crew to change behavior (e.g., the caution level alert), multiple questions can be answered for a task that is changed through the changed behavior, such as whether flight attitude, system management, or flight deck configuration is changed.

The answers determine the inner-priority of operational impacts that are assigned the caution level alert that "Changed Behavior" type crew responses. For example, if a first task affects the flight attitude, then the corresponding operational impact is prioritized higher than for a second task that does not affect flight attitude but does change system management. Similarly, if for a third task does not affect flight attitude and system management but does change the flight deck configuration, it may have a lower priority than the first and second tasks. If alert events for these three task are detected at the same time, the alert events are all displayed in the caution section of the GUI, but the alert event corresponding to the first task may be displayed at the top of that section while the alert event corresponding to the second task may be displayed at the middle of that section and the alert event corresponding to the third task may be displayed at the bottom of that section. That is, the prioritizier 115 in FIG. 1 can use this information to prioritize the alert events in the same alert level when displaying them on the GUI 165.

In some aspects, prioritizing within the warning alert level can be performed by ordering the alert events in the GUI based on assigned time constants (less time=higher urgency results in higher alert priority), if time constants are the same for multiple alerts, then they are prioritized by order (time) of appearance, or for alerts with situation-dependent time-constants (e.g. time until impact) where the alert priority may change based on the derivative of the change to avoid constantly changing alert order.

In some aspects, prioritizing within the advisory alert level can be performed by ordering the alert events in the GUI based on alerts that have a crew response associated and require monitoring of an external parameter to determine the need and start of the execution of the crew response, alerts that have a crew response associated that is not time-constraint where execution is solely at the crew's discretion, and by time of appearance.

At block 840, the alert system populates the alert database, which can be any suitable type of database (e.g., a relational database or hierarchical database). The alert database stores the alert events, the operational impacts of the alert events, and the assigned alert levels of the operational impacts. Because of the top down approach described in the method 800, the alert events are deviations from normal operations and can include engine failure, low tire pressure, brake system failures, loss of autopilot, and the like.

The alert events can list the crew responses (e.g., the actions 115 in FIG. 1)) that were identified at block 820 that should be performed in response to the alert events. For example, if the alert event is the loss of the hydraulic pressure in the brakes, the action may be to activate a manually braking system or use an ancillary system (e.g., reverse thrusters). The alert events can have multiple crew responses, or no crew responses.

The alert database can also store the alert levels (e.g., the suggested alert levels 120 in FIG. 1) assigned to the operational impacts at block 820 and 825. For example, each alert event can list the operational impact the alert has (or does not have) on each operational phase of the normal mission. The operational impacts can be assigned respective alert levels using the method 800 and then stored in the alert database. The alert levels stored in the alert database can then be contextualized as discussed in the methods 200 and 700 above.

At block 845, the alert system generates software code to check for violations of the capability descriptions during operation of the vehicle. That is, at block 810, the expert can identify when the capability description is violated such as when a vehicle cannot use the capability in a normal manner at one or more flight phases. For example, if autopilot is lost or tire pressure is lower than a desired threshold. The software code can receive input from sensors disposed in the vehicle as discussed block 210 to identify violations of the capabilities.

In one aspect, the alert system can include software code for checking for each of the violations identify at block 810. This software code can then be executed by the alert generator 135 in FIG. 1 to evaluate the data provided by the sensors 130 to detect an alert event stored in the alert database 105. In this manner, the top down approach for generating the alert database in method 800 can result in software code that can identify the violations that correspond to the alert events stored in the alert database.

In the current disclosure, reference is made to various aspects. However, it should be understood that the present disclosure is not limited to specific described aspects. Instead, any combination of the following features and elements, whether related to different aspects or not, is contemplated to implement and practice the teachings provided herein. Additionally, when elements of the aspects are described in the form of "at least one of A and B," it will be understood that aspects including element A exclusively, including element B exclusively, and including element A and B are each contemplated. Furthermore, although some aspects may achieve advantages over other possible solutions and/or over the prior art, whether or not a particular advantage is achieved by a given aspect is not limiting of the present disclosure. Thus, the aspects, features, aspects and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects described herein may be embodied as a system, method or computer program product. Accordingly, aspects may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects described herein may take the form of a computer program product embodied in one or more computer readable storage medium (s) having computer readable program code embodied thereon.

Program code embodied on a computer readable storage medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to aspects of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various aspects of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. A method, comprising:
   identifying a normal mission of a vehicle based on descriptions of capabilities of the vehicle in a plurality of operational phases, wherein the normal mission is divided into the plurality of operational phases;
   identifying deviations from the descriptions of the capabilities that cause the vehicle to deviate from the normal mission in at least one of the plurality of operational phases;
   identifying operational impacts on the vehicle caused by the deviations;
   assigning alert levels to the operational impacts;
   populating an alert database that stores alert events corresponding to the deviations and the alert levels assigned to the operational impacts; and
   generating software code to monitor sensor data during operation of the vehicle to identify the deviations.

2. The method of claim 1, wherein assigning the alert levels to the operational impacts further comprises:
   determining crew responses for the operational impacts; and
   determining types of the crew responses, wherein the alert levels are assigned based on the types of the crew responses.

3. The method of claim 2, wherein assigning the alert levels to the operational impacts further comprises:
   determining an urgency for the crew responses that require action by a crew member in the vehicle, wherein the alert levels for the crew responses that require action are assigned based on the urgency,
   wherein the crew responses that request the crew member to perform mission re-planning are always assigned a first alert level and the crew responses that request the crew member to change a behavior are always assigned a second alert level different from the first alert level.

4. The method of claim 1, further comprising:
   prioritizing the operational impacts in the alert levels, such that operational impacts assigned the same alert level have different priorities.

5. The method of claim 1, wherein the operational impacts are assigned one alert level, the method further comprising:
   determining that a first operational impact of the operational impacts corresponds to a plurality of crew response types, wherein the plurality of crew response types are assigned different alert levels; and
   assigning the highest one of the different alert levels to the first operational impact.

6. The method of claim 1, wherein the vehicle is an aircraft and the plurality of operational phases includes a plurality of flight phases occurring when the aircraft travels between airports.

7. The method of claim 1, further comprising:
   executing the software code in the vehicle;
   detecting an alert event in a vehicle using the software code;
   querying the alert database to identify an alert level assigned to an operational impact corresponding to the alert event; and
   outputting, for display in a graphical user interface (GUI), the alert event based on the alert level.

8. A system, comprising:
   a processor; and
   a memory including instructions that when executed by the processor enable the system to perform an operation, the operation comprising:
      identifying a normal mission of a vehicle based on descriptions of capabilities of the vehicle in a plurality of operational phases, wherein the normal mission is divided into the plurality of operational phases;
      identifying deviations from the descriptions of the capabilities that cause the vehicle to deviate from the normal mission in at least one of the plurality of operational phases;
      identifying operational impacts on the vehicle caused by the deviations;
      assigning alert levels to the operational impacts;
      populating an alert database that stores alert events corresponding to the deviations and the alert levels assigned to the operational impacts; and
      generating software code to monitor sensor data during operation of the vehicle to identify the deviations.

9. The system of claim 8, wherein assigning the alert levels to the operational impacts further comprises:

determining crew responses for the operational impacts; and determining types of the crew responses, wherein the alert levels are assigned based on the types of the crew responses.

10. The system of claim 9, wherein assigning the alert levels to the operational impacts further comprises:

determining an urgency for the crew responses that require action by a crew member in the vehicle, wherein the alert levels for the crew responses that require action are assigned based on the urgency, wherein the crew responses that request the crew member to perform mission re-planning are always assigned a first alert level and the crew responses that request the crew member to change a behavior are always assigned a second alert level different from the first alert level.

11. The system of claim 8, wherein the operation further comprises:

prioritizing the operational impacts in the alert levels, such that operational impacts assigned the same alert level have different priorities.

12. The system of claim 8, wherein the operational impacts are assigned one alert level, the operation further comprises:

determining that a first operational impact of the operational impacts corresponds to a plurality of crew response types, wherein the plurality of crew response types are assigned different alert levels; and assigning the highest one of the different alert levels to the first operational impact.

13. The system of claim 8, wherein the vehicle is an aircraft and the plurality of operational phases includes a plurality of flight phases occurring when the aircraft travels between airports.

14. The system of claim 8, wherein the operation further comprises:

executing the software code in the vehicle;

detecting an alert event in a vehicle using the software code;

querying the alert database to identify an alert level assigned to an operational impact corresponding to the alert event; and outputting, for display in a graphical user interface (GUI), the alert event based on the alert level.

15. A non-transitory computer-readable medium containing computer program code that, when executed by operation of one or more computer processors, performs an operation comprising:

identifying a normal mission of a vehicle based on descriptions of capabilities of the vehicle in a plurality of operational phases, wherein the normal mission is divided into the plurality of operational phases;

identifying deviations from the descriptions of the capabilities that cause the vehicle to deviate from the normal mission in at least one of the plurality of operational phases;

identifying operational impacts on the vehicle caused by the deviations;

assigning alert levels to the operational impacts;

populating an alert database that stores alert events corresponding to the deviations and the alert levels assigned to the operational impacts; and generating software code to monitor sensor data during operation of the vehicle to identify the deviations.

16. The non-transitory computer-readable medium of claim 15, wherein assigning the alert levels to the operational impacts further comprises:

determining crew responses for the operational impacts; and determining types of the crew responses, wherein the alert levels are assigned based on the types of the crew responses.

17. The non-transitory computer-readable medium of claim 16, wherein assigning the alert levels to the operational impacts further comprises:

determining an urgency for the crew responses that require action by a crew member in the vehicle, wherein the alert levels for the crew responses that require action are assigned based on the urgency, wherein the crew responses that request the crew member to perform mission re-planning are always assigned a first alert level and the crew responses that request the crew member to change a behavior are always assigned a second alert level different from the first alert level.

18. The non-transitory computer-readable medium of claim 15, wherein the operation further comprises:

prioritizing the operational impacts in the alert levels, such that operational impacts assigned the same alert level have different priorities.

19. The non-transitory computer-readable medium of claim 15, wherein the operational impacts are assigned one alert level, the operation further comprises:

determining that a first operational impact of the operational impacts corresponds to a plurality of crew response types, wherein the plurality of crew response types are assigned different alert levels; and assigning the highest one of the different alert levels to the first operational impact.

20. The non-transitory computer-readable medium of claim 15, wherein the vehicle is an aircraft and the plurality of operational phases includes a plurality of flight phases occurring when the aircraft travels between airports.

* * * * *